(12) United States Patent
Halder et al.

(10) Patent No.: US 8,992,656 B2
(45) Date of Patent: Mar. 31, 2015

(54) CONTROLLABLE SOLIDS INJECTION

(71) Applicants: Sabuj Halder, Monroeville, PA (US); William J. Mahoney, East Aurora, NY (US); Bryan Bielec, Hamburg, NY (US); Robert Churpita, Niagara Falls, NY (US)

(72) Inventors: Sabuj Halder, Monroeville, PA (US); William J. Mahoney, East Aurora, NY (US); Bryan Bielec, Hamburg, NY (US); Robert Churpita, Niagara Falls, NY (US)

(73) Assignee: Praxair Technology, Inc., Danbury, CT (US)

( * ) Notice: Subject to any disclaimer, the term of this patent is extended or adjusted under 35 U.S.C. 154(b) by 120 days.

(21) Appl. No.: 13/718,685

(22) Filed: Dec. 18, 2012

(65) Prior Publication Data

US 2013/0160606 A1    Jun. 27, 2013

Related U.S. Application Data

(60) Provisional application No. 61/578,569, filed on Dec. 21, 2011.

(51) Int. Cl.
| | | |
|---|---|---|
| *F27D 3/00* | (2006.01) | |
| *C21C 5/46* | (2006.01) | |
| *C21C 5/52* | (2006.01) | |
| *C21C 5/54* | (2006.01) | |
| *F27B 3/22* | (2006.01) | |

(52) U.S. Cl.
CPC ............ *F27D 3/0025* (2013.01); *C21C 5/4606* (2013.01); *C21C 5/5217* (2013.01); *C21C 5/54* (2013.01); *F27B 3/22* (2013.01); *F27D 3/0033* (2013.01)
USPC .......................................................... 75/10.46

(58) Field of Classification Search
CPC ...... C21C 5/4606; C21C 5/54; C21C 5/5217; F27D 3/0025; F27D 3/0033; F27B 3/22
USPC .......................... 75/10.46, 10.4; 266/268, 265
See application file for complete search history.

(56) References Cited

U.S. PATENT DOCUMENTS

| | | | |
|---|---|---|---|
| 4,358,053 A | 11/1982 | Ingham et al. | |
| 4,416,421 A | 11/1983 | Browning | |
| 4,869,936 A | 9/1989 | Moskowitz et al. | |
| 5,330,798 A * | 7/1994 | Browning | 427/446 |
| 5,531,590 A | 7/1996 | Browning | |
| 5,932,293 A * | 8/1999 | Belashchenko et al. | 427/446 |
| 2005/0040571 A1* | 2/2005 | Matthias et al. | 266/217 |
| 2011/0265715 A1* | 11/2011 | Keller | 118/600 |

FOREIGN PATENT DOCUMENTS

| | | |
|---|---|---|
| EP | 0918093 | 5/1999 |
| EP | 1170386 | 1/2002 |
| WO | WO 00/28097 | 5/2000 |

* cited by examiner

*Primary Examiner* — George Wyszomierski
*Assistant Examiner* — Tima M McGuthry Banks
(74) *Attorney, Agent, or Firm* — Donald T. Black

(57) ABSTRACT

The present invention relates to formation of a controllable, high velocity, pneumatic stream of particulate solids which can be injected into a furnace containing, for instance, a liquid such as a bath of molten metal.

3 Claims, 1 Drawing Sheet

CONTROLLABLE SOLIDS INJECTION

FIELD OF THE INVENTION

The present invention relates to formation of a controllable, high velocity, pneumatic stream of particulate solids which can be injected into, for instance, a liquid such as a bath of molten metal.

BACKGROUND OF THE INVENTION

Many industrial processes, particularly metal refining, involve feeding particulate solid reagents into bodies of liquid. A notable example is the addition of carbonaceous material, and the addition of lime and/or other slagging agents, into molten metal in an electric arc furnace (EAF), in which there is usually a molten slag phase atop a molten metal phase. The present invention provides advantageous apparatus and methodology useful for carrying out this sort of activity.

In EAF operations, carbon is injected to react with molten slag to decrease iron oxides (by reduction of the iron oxides to metallic iron) and to optimize foamy slag practice. This practice results in reduced electrode consumption, reduction in arc noise, increased lining refractory lifetime, and overall improved power economy and specific thermal efficiency. Carbon injected through the slag layer can intentionally raise carbon levels in the molten metal when desired.

In EAF operations, lime can be injected through sidewall injectors to improve slag practices through better slag chemistry control. This practice can result in a cleaner environment for the shop (less dust losses from the furnace) and reduced losses of lime to the furnace evacuation system, lowering the specific lime consumption, reduced maintenance cost compared to mechanical systems, faster dissolution of lime related to increased surface area, and overall improved steel process performance. Lime injection also participates in sulfur and phosphorus removal.

BRIEF SUMMARY OF THE INVENTION

One aspect of the present invention is apparatus comprising (A) a combustion chamber having first and second opposed ends, (B) a burner within said combustion chamber at one of said opposed ends, and inlets for fuel and for oxidant to said burner from outside said apparatus;

(C) a nozzle having an inlet and an outlet, wherein the inlet is at the other of said opposed ends of said combustion chamber, (D) a duct having an upstream end closed around the outlet of said nozzle and an open downstream end, and (E) a feeder tube having an inlet outside said apparatus and an outlet in said duct between the closed and open ends of said duct, wherein said combustion chamber, said nozzle, and said duct are coaxial.

Another aspect of the invention is a method comprising (A) feeding fuel and oxidant into the combustion chamber of said apparatus through the respective inlets therefor and combusting said fuel and oxidant in said combustion chamber to produce a stream of hot gas comprising products of said combustion which stream passes through said nozzle into said duct, and (B) feeding particulate solids through said feeder tube into said duct and entraining said solids in said stream of combustion products to form a mixed stream which passes out of the open end of said duct.

Yet another aspect of the invention is a method of injecting solids into an electric arc furnace, wherein the electric arc furnace contains a molten metal bath and a slag layer on top of the molten metal bath, and wherein there is a layer comprising a mixture of slag and molten metal between the molten metal bath and the slag layer, the method comprising the steps of carrying out the aforementioned method to produce a high velocity stream of said solids mixed with said gas, and injecting said stream toward the molten metal bath at a velocity such that the stream penetrates into the slag layer, or through the slag layer into said mixture of slag and molten metal, or through the slag layer and through said mixture into the surface of the molten metal bath. The velocity of the stream of solids mixed with gas is controllable to control the penetration depth of said stream. The high velocity injection minimizes the consumption of reactive particulates (carbon with flame gases) during the time of flight to the bath.

In other aspects of the invention, solids can be injected as described herein into a molten metal bath that does not have a slag layer; or into a kiln, furnace, or chemical reactor.

DETAILED DESCRIPTION OF THE INVENTION

Figure 1:
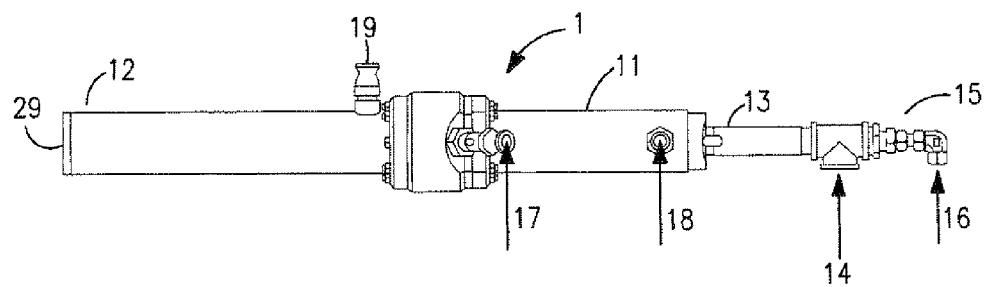
FIG. 1 is a view of the exterior of an injector according to the invention.
Figure 2:
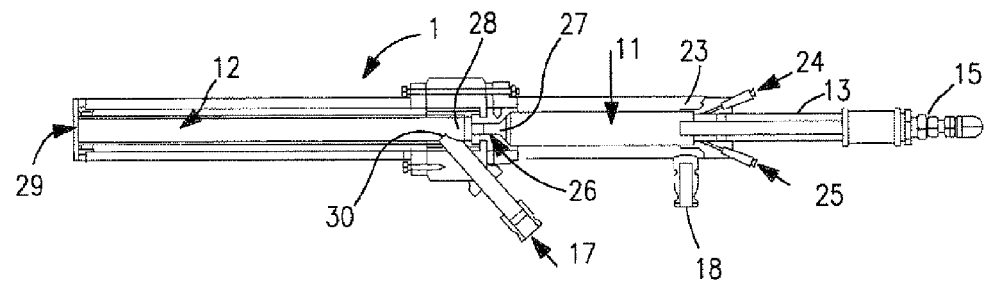
FIG. 2 is a cross-sectional view of the injector of FIG. 1.

FIGS. 1 and 2 show exterior and cross-sectional views of injector 1. The injector as seen in FIG. 2 has been rotated 90 degrees about its longitudinal axis compared to the view seen in FIG. 1.

Referring first to FIG. 1, injector 1 includes a water cooled enclosed combustion chamber located at 11. Duct 12 extends from one end of the combustion chamber 11, and oxidant feed line 13 and fuel feed line 15 extend from the other end of combustion chamber 11. Oxidant feed line 13 includes oxidant inlet 14, which can be connected to a source of oxidant. Fuel feed line 15 includes fuel inlet 16, which can be connected to a source of fuel. Tube 17 is used to feed solids into injector 1, as is described more fully below. Injector 1 is preferably cooled by water circulating through passages within the walls of combustion chamber 11 and duct 12. Cooling water is preferably fed through an inlet such as cooling water inlet 18, and preferably exits the injector 1 through an outlet such as cooling water outlet 19.

Referring now to FIG. 2, additional detail of injector 1 can be seen. Burner 23 is established within combustion chamber 11 at one end of combustion chamber 11. Oxidant feed line 13 and fuel feed line 15 feed oxidant and fuel (respectively) to burner 23. Preferably, lines 13 and 15 are concentrically arranged, with fuel feed line 15 coaxially aligned within oxidant feed line 13. The open ends of lines 13 and 15 within combustion chamber 11 comprise a preferred form of burner 23. A spark igniter activated pilot flame device 24 is provided, to ignite the combustible mixture of fuel and oxidant in combustion chamber 11. A pressure port 25 that taps into combustion chamber 11 is also provided.

At the end of combustion chamber 11 opposite the end where burner 23 is located, is nozzle 26. While a converging-diverging nozzle configuration is shown, the invention can be practiced with any expansion nozzle, e.g., converging (in the direction of gas flow through the nozzle) rather than converging-diverging. Nozzle 26 has nozzle inlet 27 that opens to the interior of combustion chamber 11. Gases that enter inlet 27 pass through nozzle 26, and then exit nozzle 26 through nozzle outlet 28.

The optimal nozzle dimensions for any given embodiment of injector 1 will depend upon the amount of thrust required to propel the amount of solid particulates to be injected by the given injector. Higher solid feeding rates would correspondingly require a higher amount of propulsion gas, to provide an effective powder velocity. Nozzle design accounts for the wide range of practical fuel supply pressures available. Adding a compressor to increase available supply pressure is an option and would depend on benefits to justify its cost. Under circumstances when the fuel supply pressure is not adequately high, the combustion chamber pressure is limited by this parameter. The nozzle dimensions will be relatively larger for those conditions in order to generate the requisite amount of gas for adequate propulsion.

Outlet 28 of nozzle 26 opens into one end of duct 12. The other end 29 of duct 12 opens to the ambient surroundings, such as the interior of an electric arc furnace.

The aforementioned tube 17 ends at opening 30 which is within duct 12, preferably near the end of duct 12 that is at outlet 28 of nozzle 26. The axis of tube 17 at opening 30 is oblique to the axis of duct 12 and to the axis of nozzle 26, forming an angle preferably of 10 to 80 degrees. Preferably, combustion chamber 11, nozzle 26 and duct 12 are coaxial with each other.

Figure 3:
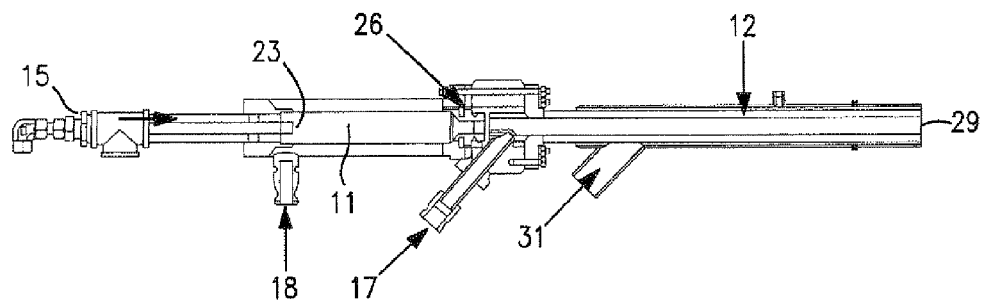
FIG. 3 is a cross-sectional view of another embodiment of an injector according to the invention.

Another embodiment is shown in FIG. 3. Additional inlet 31 is provided through which an additional gas, preferably an oxidizing fluid having an oxygen content higher than 21 vol. %, is added to mix with, or to surround, the mixture of solids and combustion products that is formed in duct 12. The additional gas can be at ambient temperature or can have been preheated.

Example 1

This example provides more specific detail as an illustration of one embodiment of the injector.

The walls of the combustion chamber 11 are preferably made of metal, such as copper in this example, to dissipate the heat from the combustion reactions more quickly and prevent equipment damage. The combustion chamber in this example is about 12" long with a 2.125" internal diameter.

At the burner end of the combustion chamber 11 is a brass end piece that is cooled by the cooling water circuit. This brass end piece has provisions for installation of an oxygen-natural gas burner 23. The fuel duct 15 is of ¾" SS316 tubing while the annular oxygen pipe 13 is a 1.5" SCH 40 Stainless steel nipple. The concentricity of the two pipes 13 and 15 is maintained by means of a set of spiders. This burner set-up is threaded into the brass end piece at one end of the combustion chamber 11. The fuel nozzle at the end of burner 23 is a dome shaped nozzle, to stabilize the combustion, and is made out of Inconel 601 for better high temperature oxidation resistance. However, other embodiments of this apparatus of the present invention need not include water cooling of the combustion chamber 11.

At the other end of the combustion chamber 11 is a flange made out of copper that contains the convergent divergent (C-D) nozzle 26. This flange has through holes running across its width arranged circumferentially around the nozzle through which cooling water flows and prevents overheating of the nozzle. The nozzle throat diameter in this example is 0.8" and its exit diameter is 1.0". The divergence angle of this nozzle 26 is 8.3 degrees with respect to the nozzle axis and the nozzle throat length is about 0.79".

Adjacent to the nozzle flange is a brass member that houses the solids inlet pipe 17 and the duct 12. This brass member has through holes running across its thickness for the cooling water to flow. The solids inlet pipe 17 comes in at an angle of 50 degrees with respect to the injector axis. The duct 12 that carries the solids with the hot combustion products from the combustion chamber is made out of 1.5" SCH 80 Brass pipe. The duct is preferably attached to the rest of the injector 11 but is not physically welded to any other member, thereby making it a replaceable component. The reason for making this member an expendable component is the gradual wear and tear due to the abrasive action of the solid particles against the walls of the pipe. Cooling water flows within passages along the length of this pipe and makes a U-turn at the front face of the duct before flowing back to the cooling water outlet. The front face of the duct that marks the duct exit is made out of copper and is designed such that the cooling water flowing under intimate contact with it keeps it from overheating.

OPERATION: Operation of the injector 1 includes combusting fuel and oxidant that are fed to the combustion chamber 11, flowing and expanding a stream of gaseous combustion products formed in that combustion through the converging/diverging nozzle 26, feeding solids through tube 17 into duct 12 and entraining the solids in the stream of combustion products, and flowing the resulting combined stream of solids and gases out of duct 12 to a desired application.

Referring first to the combustion, fuel and oxidant are fed into combustion chamber 11. Preferred fuel is any combustible gaseous composition, such as natural gas, any other hydrocarbons that are gaseous at ambient atmospheric conditions such as propane, coke oven gas, blast furnace offgas, offgas from other chemical or petrochemical operations, and mixtures of any of these. The invention may also be practiced using as the fuel an atomized liquid hydrocarbon such as kerosene, fuel oil, or other combustible compositions that are liquid at ambient atmospheric conditions.

The oxidant must of course contain oxygen. While air and oxygen-enriched air are useful, the oxidant preferably has a higher oxygen content such as at least 50 vol. % and more preferably at least 90 vol. %.

The ratio of fuel to oxidant fed to combustion chamber is preferably sufficient to provide stoichiometrically complete combustion of the fuel.

The composition of rocket propulsion gases can be controllable, from oxidizing to reducing. For example, it may be useful to run fuel rich propulsion gases to minimize reactivity with carbon particulates or to enhance a pre-reduction reaction for the injection of iron-oxide containing furnace dust.

The combustion of fuel and oxidant in combustion chamber 11 produces gaseous combustion products which generally would include combustion radicals, hydrogen, carbon monoxide, carbon dioxide, water vapor, and oxygen, as well as possible inert components that do not participate in the combustion, such as nitrogen.

The fuel and oxidant are fed to the combustion chamber in sufficient amounts so that the pressure of all the gaseous components within the combustion chamber 11 is 20 to 150 psig. The gaseous combustion products pass into and through the converging/diverging nozzle and emerge from that nozzle at a velocity on the order of 500 to 5000 feet per second (fps) and preferably a velocity of 2000 to 4000 fps. The temperature of this stream is typically 3500° F. to 5000° F. The solids fed through tube 17 into duct 12 can be any that are capable of participating in any chemical reaction or physical effect upon reaching and contacting the desired target material (i.e. the slag layer and/or the mixture of slag and molten metal and/or the molten metal bath). Examples of solids include materials that provide carbon in elemental and/or highly reduced form, such as charcoal and coke; other solid reagents, such as lime; materials that are reactive or inert, such as silica, alkali or alkaline earth metal compounds including sodium silicate, sodium chloride, potassium silicate, potassium chloride, sodium oxide, potassium oxide, magnesium oxide, magnesium chloride or other halides, and the like. Preferred solids include carbon-containing materials (such as coal, pet coke, and the like), lime, and EAF furnace dust.

The solids are preferably in particulate form, ranging in particle size up to 2 mm. The solids are conveyed into and through tube 17 into the duct through use of a suitable mechanism such as a roto-feeder mechanism. Those experienced in this field will recognize the many known and commercially available mechanisms that can feed such materials through a feed tube such as tube 17, into a device such as injector 1. The solids may be fed in combination with a transport gas such as air or nitrogen. The solids are fed at a rate that is typically in the range of 50 lbs/min to 300 lbs/min per injector, keeping in mind that several injectors can be installed in an EAF, depending upon the material that is required for injection as well as the size of the batch process making use of the solids, where a certain amount of material is to be processed.

The solids from tube 17 and the gaseous stream from nozzle 26 combine, and flow as a combined stream through duct 12 and out the end 29 of duct 12.

The injector 1 is cooled along its entire length to maintain the integrity not only of the different members, but also of the sealing gaskets at joints. The cooling water circuit, if one is employed, preferably has a centrifugal pump in it to boost the pressure. Typically, the water flow rate through the injector 1 is approximately 40-45 gallons per minute.

The converging-diverging nozzle design also allows realization of negative stagnant pressure conditions at the solids inlet 30 in the duct under normal flame jet operations. The extent of the negative pressure at this location depends on the burner firing rate for a specific nozzle design. Negative pressure conditions are essential as they have a positive influence on the solids flow from the solids feeder to the injector as well as a protective safety measure that prevents back flow of the hot gases from the injector into the solids feeder through the solids conveying hose.

The device can be operated at different burner firing rates for a specific nozzle design, each corresponding to an associated combustion chamber pressure. As the firing rate increases, so does the combustion chamber pressure and the resultant thrust generated by the flame jet. The performance of the device towards acceleration of particles was found to be strongly dependent upon the duct length, thereby highlighting the residence time of the particles in contact with the propulsion gas inside the duct. Longer residence times by virtue of longer ducts promote greater degree of momentum exchange between the gas phase and the particles. However, once the particles attain their terminal velocities under these conditions, further contact with the gas phase does not warrant any significant velocity increase. Therefore, continuing to increase the length of the duct reaches a point beyond which there is no further benefit in terms of velocity of the combined stream.

The combustion chamber pressure of the current design can be flexibly operated between 20-100 psig for a specific converging-diverging nozzle design depending upon the level of thrust required. Operation at higher chamber pressures using a gaseous fuel like natural gas is usually limited by its supply pressure. Therefore, at locations where natural gas supply pressure is not sufficient, other steps should be taken, such as altering the nozzle design proportionately to maintain the requisite amount of thrust, or adding compression via a compressor.

The present invention is particularly useful to inject solids into liquid baths, such as baths of molten metal such as are present in steel furnaces including electric arc furnaces. Carbonaceous material such as charcoal and/or coke can be propelled into the molten metal, even through a layer of slag that is conventionally present on the surface of the molten metal.

The present invention provides many advantages, including these: Acceleration of solid reactive particulates at feed rates in the excess of 50 lbs/min under dense phase conveying regimes to sufficiently high velocities to aid conveyance to targets over distances greater than 5 feet employing a supersonic oxy-fuel flame jet Control of particle momentum by virtue of controlling thrust imparted by flame jet or the amount of oxy-fuel combustion Control of particle mass loading in the two-phase flow by regulating the amount of hot propulsion gas generated for accelerating a certain injection rate of particulate reagent.

It can be utilized as a scrap melting/cutting device in the near field of the jet by altering the flame jet chemistry It can be employed as an oxy-solid fuel burner that utilizes combustion reactions of an oxygen stream (at ambient temperature) with a solid fuel stream that undergoes thermal and chemical activation in situ.

It can be employed to convey solid reagents for reaction over a long range reaction zone by utilizing the variable thrust generation capability of the device such as a coal slinging device in sponge iron kilns.

It enhances particle velocities for higher penetrative capabilities to minimize effect of stray aerodynamic forces. Maintenance of trajectory and minimal time of flight inside the furnace atmosphere are key advantages in this regard.

Improved reaction capabilities of the pre-heated chemical reagent with its conveyance to reaction zones that can be in close proximity or several diameters downstream of the device.

Burner flame chemistry can be altered to generate a high temperature oxygen jet if required that could be subsequently utilized for other purposes requiring chemical reaction capabilities with oxygen.

Burner combustion and therefore, thrust generation and particle momentum can be controlled.

Higher specific thrust of the propulsion medium. In other words, thrust generated per unit mass of propulsion gas is much higher using the present oxy-fuel combustion approach as compared to a cold propulsion medium.

Similar or higher degree of particle acceleration is possible using a lower amount of hot propulsion gas (higher particle mass loading in two phase stream) in comparison to the usual pneumatic approaches using a cold propulsion medium.

This invention avoids the drawbacks of other pneumatic means employing air as the propulsion medium, which have to pay a price for air compressors as well as costs that account for the energy requirements towards heating up the cold propulsion air from ambient to the furnace temperature. Also, nitrogen from the air could cause steel cleanliness issues.

The ability to control the combustion of the reactive solid reagent particles, if they are combustible, by altering the amount of hot reactive gas available per unit mass of solid reagent. So, this invention can be used to inject solid particulate reagents by reducing the amount of free oxygen present in the hot propulsion gas stream. Alternatively, the invention can be used to burn the solid reagent as a fuel if additional heat is required in the furnace.

The pre-heated combined gas-solids stream is less likely to entrain hot furnace gases due to lower density differences, thereby improving the compactness/coherency of the two phase stream. On the other hand, use of a cold propulsion medium is at a disadvantage from this perspective.

Minimization of plugging concerns of the injector barrel exit posed due to splashing of slag/liquid metal due to the presence of a supersonic high momentum high temperature oxy-fuel flame jet.

Improved injection and reactive capabilities of the combined solids-containing stream with the liquid bath cause earlier initiation of stable slag foaming. This could have potential impact upon the process yield and lower electric power consumption.

The capability to use solids that could be a typical process waste stream (recycled EAF dust) or a chemical reactant stream that could participate in a chemical reaction with a target reactant (a melt or a gaseous stream) with subsequent process benefit.

High velocity injection also aids in improved injection efficiency of particulates, resulting in less carrying out of solids with the furnace exhaust.

Other benefits of the invention include:

Reduced effect of turbulence phenomena on breaking up solid stream than traditional powder injection methods Pre-heated carbon particles could enhance reaction kinetics with slag FeO if chemical reaction is controlling Could lead to reduced yield loss in terms of final slag FeO Could lower un-reacted carbon loss through the slag (carryover)

Supersonic flame jet can pre-heat and melt scrap in the near vicinity of device

Re-establishing a desired foamy slag layer after process disruption

Higher carbon injection efficiency, lower loss of carbon through fourth hole

Reduction in electric power consumption and reduced refractory wear due to better slag foaming Useful for re-carburization of the molten metal bath, if required

What is claimed is:

1. A method of injecting solids into an electric arc furnace, wherein the electric arc furnace contains a molten metal bath and a slag layer on top of the molten metal bath, and wherein there is a layer comprising a mixture of slag and molten metal between the molten metal bath and the slag layer, the method comprising
(A) feeding fuel and oxidant into the combustion chamber of apparatus comprising
(A.1) a combustion chamber having first and second opposed ends,
(A.2) a burner within said combustion chamber at one of said first and second opposed ends, and inlets for fuel and for oxidant to said burner from outside said combustion chamber;
(A.3) a nozzle having an inlet and an outlet, wherein the inlet is at the other of said first and second opposed ends of said combustion chamber,
(A.4) a duct having an upstream end closed around the outlet of said nozzle and an open downstream end, and
(A.5) a feeder tube having an inlet outside said apparatus and an outlet in said duct between the closed and open ends of said duct, wherein said combustion chamber, said nozzle, and said duct are coaxial,
through the inlet for fuel and the inlet for oxidant, respectively, and combusting said fuel and oxidant in said combustion chamber to produce a gaseous stream of gas comprising products of said combustion which stream passes through said nozzle into said duct, and
(B) feeding particulate solids through said feeder tube into said duct and entraining said solids in said stream of combustion products to form a mixed stream consisting of said particulate solids and said gaseous stream which passes out of the open end of said duct,
and injecting said mixed stream toward the molten metal bath at one of (i) a velocity controlled such that the mixed stream penetrates into the slag layer, or (ii) a velocity controlled such that the mixed stream penetrates through the slag layer into said mixture of slag and molten metal, or (iii) a velocity controlled such that the mixed stream penetrates both through the slag layer and through said mixture of slag and molten metal and penetrates into the molten metal bath.

2. A method of injecting solids into a furnace, the method comprising
(A) feeding fuel and oxidant into the combustion chamber of apparatus comprising
(A.1) a combustion chamber having first and second opposed ends,
(A.2) a burner within said combustion chamber at one of said first and second opposed ends, and inlets for fuel and for oxidant to said burner from outside said combustion chamber;
(A.3) a nozzle having an inlet and an outlet, wherein the inlet is at the other of said first and second opposed ends of said combustion chamber,
(A.4) a duct having an upstream end closed around the outlet of said nozzle and an open downstream end, and
(A.5) a feeder tube having an inlet outside said apparatus and an outlet in said duct between the closed and open ends of said duct, wherein said combustion chamber, said nozzle, and said duct are coaxial,
through the inlet for fuel and the inlet for oxidant, respectively, and combusting said fuel and oxidant in said combustion chamber to produce a gaseous stream of gas comprising products of said combustion which stream passes through said nozzle into said duct, and
(B) feeding particulate solids through said feeder tube into said duct and entraining said solids in said stream of combustion products to form a mixed stream consisting of said particulate solids and said gaseous stream which passes out of the open end of said duct,
and injecting said mixed stream into said furnace.

3. A method according to claim 2, wherein said furnace contains molten metal and said mixed stream penetrates into said molten metal.

* * * * *